United States Patent
Bedini et al.

(10) Patent No.: US 9,394,378 B2
(45) Date of Patent: Jul. 19, 2016

(54) PROCESS FOR OBTAINING CHONDROITIN SULPHATED AT THE 4- OR 6- POSITIONS OF N-ACETYL-GALACTOSAMINE RESIDUES

(75) Inventors: Emiliano Bedini, Pambio-noranco (CH); Mario De Rosa, Pambio-noranco (CH); Cristina De Castro, Pambio-noranco (CH); Annalida Di Nola, Pambio-noranco (CH); Michelangelo Parrilli, Pambio-noranco (CH); Odile Francesca Restaino, Pambio-noranco (CH); Chiara Schiraldi, Pambio-noranco (CH)

(73) Assignee: ALTERGON S.A., Lugano (CH)

( * ) Notice: Subject to any disclaimer, the term of this patent is extended or adjusted under 35 U.S.C. 154(b) by 298 days.

(21) Appl. No.: 13/884,432

(22) PCT Filed: Nov. 11, 2011

(86) PCT No.: PCT/EP2011/069972
§ 371 (c)(1),
(2), (4) Date: May 9, 2013

(87) PCT Pub. No.: WO2012/062917
PCT Pub. Date: May 18, 2012

(65) Prior Publication Data
US 2013/0225802 A1 Aug. 29, 2013

(30) Foreign Application Priority Data
Nov. 11, 2010 (IT) ................ MI2010A2092

(51) Int. Cl.
C08B 37/08 (2006.01)
C08B 37/00 (2006.01)
C07H 5/04 (2006.01)
C07H 5/06 (2006.01)

(52) U.S. Cl.
CPC ......... *C08B 37/0069* (2013.01); *C08B 37/0003* (2013.01)

(58) Field of Classification Search
CPC .................. C08B 37/0069; C08B 37/0003
USPC ............................. 536/55.1; 514/54
See application file for complete search history.

(56) References Cited

PUBLICATIONS

Laura Jane Ingram, et al., The Synthesis of Sulfated . . . , 2010.
Sugahara, K., et al., Structure and Function of Oversulfated Chondroitin . . . , Trends in Glycoscience and Glycotechnology, vol. 12, No. 67, 2000.
Jun-ichi Tamura, et al., Synthesis of Chondroitin Sulfate E Hexasaccharide . . . , Bio. Biotech. Biochem. vol. 68, No. 12, 2004.
Tomohiro Maruyama, et al., Conformational Changes and Anticoagulant Activity of Chondroitin . . . , Carbohydrate Research, vol. 306, pp. 35-43, 1998.
Cristal I Gama, et al., Sulfation Patterns of Glycosaminoglycans . . . , Nature Chemical Biology, vol. 2, No. 9, 2006.
Jean-Claude Jacquinet, et al., From Polymer to Size-Defined Oligomers: A Highly Divergent and Stereocontrolled . . . , Chem. Eur. J., vol. 15, No. 37, 2009.
Aude Vibert, et al., From Polymer to Size-Defined Oligomers: A Step . . . , Chem. Eur. J., vol. 15, No. 37, 2009.
International Preliminary Report issued in counterpart International PCT Application No. PCT/EP2011/069972.
International Search Report issued in counterpart International PCT Application No. PCT/EP2011/069972.

*Primary Examiner* — Shaojia Anna Jiang
*Assistant Examiner* — Michael C Henry
(74) *Attorney, Agent, or Firm* — Silvia Salvadori, P.C.; Silvia Salvadori

(57) ABSTRACT

Disclosed is a process for the production of chondroitin sulphate, wherein N-acetyl-galactosamine residues sulphated at the 4- or 6-positions are present on the same polysaccharide chain.

9 Claims, No Drawings

PROCESS FOR OBTAINING CHONDROITIN SULPHATED AT THE 4- OR 6- POSITIONS OF N-ACETYL-GALACTOSAMINE RESIDUES

This application is a U.S. national stage of PCT/EP2011/069972 filed on Nov. 11, 2011, which claims priority to and the benefit of Italian Application No. MI2010A002092, filed on Nov. 11, 2010, the contents of which are incorporated herein by reference.

FIELD OF INVENTION

The present invention relates to the field of processes for the structural modification of polysaccharides.

STATE OF THE ART

Chondroitin sulphate belongs to the wider family of glycosaminoglycans, called GAGs. These polysaccharides, bonded covalently to proteins, such as proteoglycans, are ubiquitous constituents of the extracellular matrix of all connective tissues, in which they perform numerous functions.

Chondroitin sulphate is a natural linear polysaccharide formed by alternating N-acetyl-D-galactosamine residues β 1→4 and D-glucuronate β 1→3. In vertebrates, chondroitin is present in variously sulphated forms; the residues involved in sulphation are the 4 and 6 hydroxyl groups of N-acetyl-D-galactosamine, and in some cases also the 2 and 3 hydroxyl groups of glucuronic acid.

The molecular weight of chondroitin, and the quantity and sites of sulphation, depend on species, age and type of tissue.

Chondroitin sulphate is used as a chondroprotective and antirheumatic medicament, with applications in the treatment of tibiofibular osteoarthritis of the knee and osteoarthritis of the joint cartilage.

Currently, chondroitin sulphate is obtained by extraction techniques from various animal sources, such as pig cartilage, shark fin and teleost cartilage. The scarcity of the raw material and the complexity of the downstream purification process restricts the availability of this active ingredient at worldwide level; its market is therefore controlled by the impossibility of meeting the currently growing demand. Moreover, the increasingly severe regulations governing the safety of medicaments of animal origin which are frequently issued may exclude extracted chondroitin sulphate from the pharmaceutical market in future.

There is consequently growing interest in the development of alternative manufacturing strategies based on biotechnology and chemical synthesis to obtain this type of polysaccharides or their precursors.

The scientific literature (Rodriguez ML et al., Eur. J. Biochem., 1988, 177, 117-24; Manzoni M et al., Biotechnology Letters, 1996, 18, 383-6) and patent literature (WO 01/02597 A1) report the possibility of producing by fermentation, using E. coli K4 wild type or recombinant strains that produce a chondroitin derivative, polysaccharide K4, the carbon backbone of which is identical to those of chondroitin, except for grafting of glucuronic acid from α-fructofuranose residues at C3. Chondroitin can be obtained from polysaccharide K4 by controlled acid hydrolysis of fructose residues.

The high manufacturing yields, the simplicity of the downstream purification process developed, the low overall costs of the process and its low environmental impact make said synthesis superior to the biotechnology strategies previously described.

Said fermentation process, if suitably supplemented by a strategy of regioselective chemical sulphation of chondroitin, can therefore make the biotechnology method competitive compared with conventional processes for extracting chondroitin sulphate from raw materials of animal origin, which may be eliminated from the pharmaceutical market by recent regulatory developments regarding product safety.

The sulphation of polysaccharides structurally related to chondroitin, such as polysaccharides K4 and K5, which are formed, as stated, by repetitive sequences of glucuronic acid and N-acetyl-glucosamine in the case of K5, and glucuronic acid and N-acetyl-galactosamine in the case of K4, on which fructose residues are grafted, in this case at the glucuronic acid in position 2, is described in a series of articles and patents, but none of these documents involves regioselective sulphation processes that produce a chondroitin sulphate with the same structural characteristics as the human variety.

A synthesis scheme for the regioselective sulphation of chondroitin which leads to a sulphation pattern similar to that characteristic of human chondroitin, and the chondroitin of extractive origin today widely used today as a chondroprotective and antirheumatic medicament in the treatment of joint disease, therefore remains topical, but unsolved.

SUMMARY

Disclosed is a process which, by means of chemical synthesis from chondroitin obtained by a biotechnology process, produces a sulphation pattern similar to the one characterising human chondroitin and chondroitin of extractive origin, using synthesis approaches compatible with industrial scale-up.

DETAILED DESCRIPTION OF THE INVENTION

The present invention, by eliminating the problems present in the known processes according to the prior art, produces, by chemical synthesis, sulphated chondroitin wherein the N-acetyl-galactosamine residues are sulphated at the 4- or 6-positions on the same polysaccharide chain, as observed in human chondroitin sulphate and the chondroitin sulphate obtained today by extraction from animal sources.

The present invention consequently relates to a process for the production of chondroitin sulphate wherein galactosamine residues sulphated at the 4- or 6-positions are present on the same polysaccharide chain, characterised by the following steps: a) formation of the respective 4,6-benzylidene derivative on residues of N-acetyl-galactosamine of chondroitin in acid form; b) acylation of hydroxyl groups 2 and 3 of the glucuronic acid residues; d) oxidative opening of the benzylidene cycle; d) sulphation of the 4 or 6 hydroxyl groups of the galactosamine residues; e) elimination of the benzoyl protective group from the 4- or 6-positions of the N-acetyl-galactosamine residues and of the acetyl protective groups on the 2 and 3 hydroxyls of the glucuronic acid residues; f) purification of 4 or 6 sulphated chondroitin.

The process according to the invention is schematically illustrated below.

SCHEME

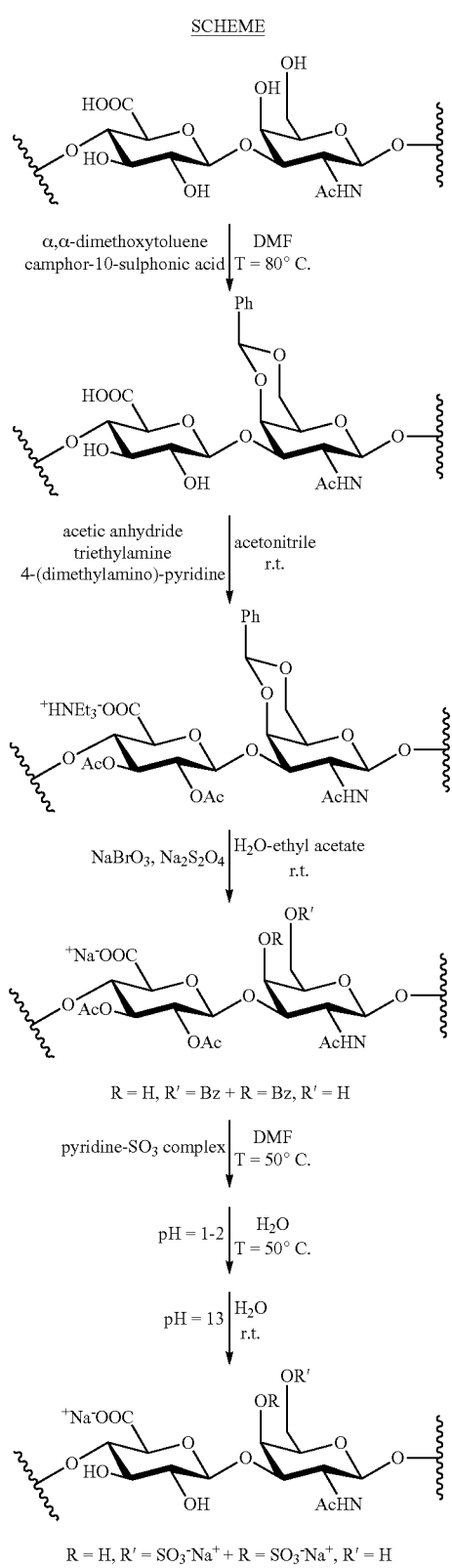

The key element of the synthesis process according to the invention is the oxidative opening of the benzylidene cycle, which allows selective protection of the 4- or 6-positions of N-acetyl-galactosamine with a benzoyl group. In this way, after only 3 protection steps, the polysaccharide chain presents disaccharide units having a single alcohol function still free, and only at the 4- or 6-position of the N-acetyl-galactosamine residue. The exhaustive sulphation of a polysaccharide thus protected easily produces a chondroitin sulphate, wherein N-acetyl-galactosamine residues sulphated at the 4- or 6-positions are present on the same polysaccharide chain. Hydrolytic cleavage of the protective groups produces a chondroitin sulphate with molecular weight and sulphation pattern characteristics similar to those of human chondroitin. The reaction scheme claimed, characterised by a single process of final purification based on membrane processes which can easily be industrially scaled up, produces chondroitin 4 or 6 sulphate in good yields at costs compatible with industrial scale-up.

The examples below describe the production of sulphated chondroitin, wherein the N-acetyl-galactosamine residues are sulphated at the 4- or 6-positions on the same polysaccharide chain, a structural characteristic recurrent in human chondroitin sulphate and the chondroitin sulphate used today as a medicament obtained by extraction from animal sources.

EXAMPLE 1

Synthesis of 4,6-benzylidene Derived from Chondroitin. Preparation of Acid Chondroitin 50 grams of chondroitin obtained by fermentation as described in Italian patent application no. 1,312,984, having a molecular weight of 38 kDa and purity>90%, is dissolved in 1.5 L of MilliQ water and kept under stirring for approx. 2 h at ambient temperature with 250 g of FLUKA Dowex 50 WX8 H+ form cation-exchange resin, 50-100 mesh, previously washed and neutralised with water. The slurry is then poured into a glass column with a 50 mm diameter porous septum (porosity 3), forming a bed approx. 50 cm high. The slurry is eluted with MilliQ water until the eluate has a pH≤2 and washed again with 250 mL of MilliQ water until the eluate is neutral. To ensure better recovery of the product, the washing solution is added to the preceding eluate containing the acid chondroitin, and the resulting solution is freeze-dried. The lyophilisate, reduced to a fine powder in a Waring blender, is further dried under vacuum overnight. The chondroitin in acid form is obtained with a molar yield exceeding 95%.

Synthesis of 4,8-benzylidene Derived from Chondroitin 42.1 g (0.111 moles) of chondroitin acid is suspended in 1 L of anhydrous N,N-dimethylformamide; 167 mL of α,α-dimethoxytoluene (1.11 moles) and 6.2 g of camphor-10-sulphonic acid (26.6 mmols) are then added in sequence to the mixture under stirring at ambient temperature. The mixture is left to react at 80° C. for 20 h. As the reaction proceeds, the suspension becomes increasingly clear, until a homogenous solution is obtained. The 4,6-benzylidene derived from chondroitin is precipitated with 2.5 L of cold acetone, and the precipitate is separated from the supernatant and dried under vacuum overnight. 49.6 g of 4,6-benzylidene derived from chondroitin is obtained, with a molar yield of 92.8%. The benzylidenation is visualised in two portions of the $^1$H-NMR spectrum: presence of a broad signal at approx. 7.3 ppm (aromatic ring protons) and a singlet at 5.5 ppm (acetalic benzyl proton).

EXAMPLE 2

Synthesis of 2,3-diacetyl Derived from 4,6-benzylidene Chondroitin 49.1 g (0.102 moles) of the product described in example 1 is suspended in 300 mL of anhydrous acetonitrile. 260 mL of triethylamine, 107 mL of acetic anhydride (1.13 moles) and 3.74 g of 4-(dimethylamine)-pyridine are added to the mixture under stirring, in that order. The mixture is left under stirring at ambient temperature for 22 h, and partly solubilises. The solid phase is removed by centrifugation, and 300 mL of isopropyl ether is added to the supernatant, causing instant precipitation of the 2,3 diacetyl derivative of 4,6-benzylidene chondroitin, which is separated from the supernatant and dried under vacuum overnight. 55.9 g (87.5 mmols) of the product is obtained, with a molar yield of 85.8%.

EXAMPLE 3

Oxidative Opening of the Benzylidene Cycle of the Product Described in Example 2

5.59 g (8.75 mmol) of the product described in example 2 is suspended in 1 L of ethyl acetate. 43.9 g of sodium bromate (0.291 moles), dissolved in 1 L of water, is added to the suspension. 42.3 g of sodium dithionite (0.243 moles), dissolved in 1.45 L of water, is added under stirring to the mixture cooled in a water and ice bath, in several aliquots to prevent overheating. The reaction mixture is left under stirring at ambient temperature for 24 h under visible light illumination. The supernatant is then removed, and the precipitate is dried under vacuum overnight. 46 g (76 mmols) of product is obtained, consisting of a mixture of 4 or 6-benzoyl derivative at the N-acetyl-galactosamine residues, with a molar yield of 86.9%. The benzylidene opening reaction is visualised by the presence of a signal at 5.4 ppm; this signal, relating to carbinol proton H-4 of N-acetyl-galactosamine, presents a higher chemical shift than other carbinol protons, due to benzoylation. 2D-NMR analysis, in particular Heteronuclear Single Quantum Coherence-Distortionless Enhancement by Polarization Transfer (HSQC-DEPT) experiments, demonstrates that the benzylidene opening takes place at random, providing N-acetyl-galactosamine units wherein position 4 is benzoylated and position 6 is unprotected, and vice versa. Three secondary carbon signals, necessarily associable with positions 6 of N-acetyl-galactosamine, are recognisable. The first two ($\delta$ 4.38/63.9 and 4.21/63.9) are consistent with the benzoylated position 6 due to the typical acylation shift of the proton chemical shift value. The perfect coincidence of the carbon chemical shift for the two signals demonstrates that the split is due to the diastereotopicity of the two protons on benzoylated position 6. The third secondary carbon signal ($\delta$ 3.34/60.3) does not present any acylation shift, and is associable with unprotected position 6.

EXAMPLE 4

Sulphation of the Product Described in Example 3, and Elimination of the Protective Groups 45 g (74.4 mmols) of the product described in example 3 is suspended in 650 mL of anhydrous N,N-dimethylformamide. 245 g (1.54 moles) of pyridine-sulphuric anhydride complex, dissolved in 1.25 L of anhydrous N,N-dimethylformamide, is added to the suspension under magnetic stirring at ambient temperature, in several aliquots. The reaction mixture rapidly becomes clear, and the solution is left under stirring at 50° C. for 23 h. The reaction product is precipitated with 6 L of a saturated solution of NaCl in acetone. The precipitate, taken up in the minimum quantity of water, gives an acid solution (pH$\approx$1-2); this solution is heated at 50° C. under stirring for 1 h to eliminate by hydrolysis any benzylidene cycles present on the N-acetyl-galactosamine residues which survived the oxidative opening reaction described in example 3. The solution is then cooled to ambient temperature and adjusted to pH$\approx$13 with NaOH, and the basic solution is kept under stirring for 6 h to remove the protecting acyl groups from the 2 and 3 positions of the glucuronic acid residues, and the benzoyl protector group from the 4- or 6-positions of the N-acetyl-galactosamine residues. The reaction volume is reduced to approx. ¼ by rotoevaporation, and the solution is diafiltered at 4° C. with 10 volumes (membrane cut-off: 10 kDa). 33.8 g of chondroitin O-sulphated at the 4- or 6-positions of N-acetyl-galactosamine (67.2 mmols), with a molar yield of 90.3%, is obtained by subsequent freeze-drying.

EXAMPLE 5

Structural Identification of the Product Described in Example 4

78 mg (0.155 mmol) of the product described in example 4 is solubilised in the minimum quantity of bidistilled water and filtered through a Sep-Pak C18 cartridge. The dried product, obtained by subsequent freeze-drying, is dissolved in 3.5 ml of 0.1 M TRIS-HCl buffer, pH 8. 3.2 units of chondroitinase ABC from *Proteus vulgaris*, dissolved in 3.2 mL of bidistilled water, are added in 4 aliquots in a 48 h interval. The enzyme is then deactivated by heating the reaction mixture at 100° C. for 5 min. The enzymatic digestate is analysed by HPLC on an ion-exchange column (0.01 to 0.2M NaCl gradient elution). The constituents of the mixture, identified by successive coinjections with pure standards, are 2-acetamide-2-deoxy-3-O-($\beta$-D-gluco-4-ene-pyranosyluronic acid)-6-O-sulpho-D-galactose, 2-acetamide-2-deoxy-3-O-($\beta$-D-gluco-4-ene-pyranosyluronic acid)-4-O-sulpho-D-galactose and 2-acetamide-2-deoxy-3-O-($\beta$-D-gluco-4-ene-pyranosyluronic acid)-D-galactose in relative ratios of 47:40:13 respectively, as evaluated by the integration of the chromatographic peaks without coinjection of standard. The order of elution agrees with the literature (Volpi N. 2004. Carbohydr. Polym, 2004, 55, 273-281).

The Nuclear Magnetic Resonance (NMR) study of the product described in example 4 is performed by dissolving 20 mg of the freeze-dried product in 0.6 mL of deuterated water and conducting one-dimensional $^1$H and $^{13}$C and two-dimensional Correlation SpectroscopY (COSY), Total Correlation SpectroscopY (TOCSY) and Heteronuclear Single Quantum Coherence (HSQC) experiments. The spectroscopy data are set out in Table.

TABLE $^1$H- and $^{13}$C-NMR data of chondroitin 4 or 6 sulphate.

| $^1$H $^{13}$C | N-acetyl-galactosamine | | | | | | glucuronic acid | | | | | | NCOCH$_3$ | NCOCH$_3$ |
|---|---|---|---|---|---|---|---|---|---|---|---|---|---|---|
| | 1 | 2 | 3 | 4 | 5 | 6 | 1 | 2 | 3 | 4 | 5 | 6 | | |
| 4-sulphate | 4.45 | 3.92 | 3.89 | 4.64 | 3.72 | 3.68 | 4.36 | 3.26 | 3.48 | 3.62 | 3.59 | — | 1.92 | — |
| | 100.7 | 51.2 | 75.6 | 76.3 | 74.4 | 60.9 | 103.6 | 72.2 | 73.5 | 81.3 | 76.2 | 174.0 | 22.4 | 174.7 |
| 6-sulphate | 4.42 | 3.90 | 3.73 | 4.07 | 3.86 | 4.11 | 4.39 | | | 3.64 | | | | |
| | 100.9 | 50.6 | 79.9 | 67.2 | 72.3 | 67.3 | 104.2 | | | 79.9 | | | | |

The invention claimed is:

1. Process for the production of chondroitin sulphate, wherein N-acetyl-galactosamine residues sulphated at 4- or 6-positions are present on the same polysaccharide chain, said process comprising:
   a) preparing 4,6-benzylidene derivative on residues of chondroitin N-acetyl-galactosamine in acid form;
   b) acylating hydroxyls in position 2 and 3 of glucuronic acid residues;
   c) oxidative opening the benzylidene cycle;
   d) sulphating hydroxyls in position 4 or 6 of the N-acetyl-galactosamine residues;
   e) eliminating the benzoyl protective group from the 4- or 6-positions of the N-acetyl-galactosamine residues, and of the acyl protective groups on the 2 and 3 hydroxyls of the glucuronic acid residues;
   f) purifying the chondroitin 4 or 6 sulphate thus obtained wherein said chondroitin sulphate has a molecular weight of between 5 and 50 KDa and the N-acetyl-galactosamine residues on each polysaccharide chain are sulphated at the 4- or 6-positions in a percentage ranging between 20 and 95%.

2. Process as claimed in claim 1, wherein step a) is obtained by reacting chondroitin in acid form with α,α-dimethoxytoluene in the presence of an acid catalyst in heterogeneous phase for 10-30 h at 70-90° C.

3. Process as claimed in claim 1, wherein step b), for the insertion of acyl protective groups on the 2 and 3 hydroxyls of the glucuronic acid residues of the 4,6-benzylidene derivative of chondroitin, is obtained by reacting the product of step a) in heterogeneous phase at ambient temperature for 10-30 h with a carboxylic acid anhydride in the presence of triethylamine and 4-(dimethylamine)-pyridine.

4. Process as claimed in claim 1, wherein step c), for the oxidative opening of the benzylidene ring, is performed by reacting the product of step b) in heterogeneous phase, at low temperature, in the presence of visible light, for 10-30 h with sodium bromate and sodium dithionite.

5. Process as claimed in claim 1, wherein step d), for the 4 or 6 sulphation of the N-acetyl-galactosamine residues, is performed by reacting the product of step c) in heterogeneous phase, at temperatures of between 10 and 100° C, for 10-60 h with pyridine-sulphuric anhydride complex.

6. Process as claimed in claim 1, wherein step e), for the elimination of the benzoyl protective group from the 4- or 6-positions of the N-acetyl-galactosamine residues and of the acyl protective groups on the 2 and 3 hydroxyls of the glucuronic acid residues, involves acid hydrolysis to eliminate any benzylidene residues still present on the 4-6 positions of N-acetyl-galactosamine, followed by alkaline hydrolysis to eliminate the acyl groups.

7. Process as claimed in claim 6, wherein the acid hydrolysis is conducted by dissolving the product of step d) in water and heating it at 50° C. for 0.1-10 h, and the subsequent basic hydrolysis is conducted by adjusting the acid hydrolysis solution to pH 13 with NaOH and maintaining it at ambient temperature for 1-20 h.

8. Process as claimed in claim 1, wherein step f), comprising purification of chondroitin 4 or 6 sulphated on the N-acetyl-galactosamine residues, involves ultrafiltration/diafiltration on membranes with a cut-off of 2-20 KDa and drying of the retentate.

9. Process as claimed in claim 8, wherein the ultrafiltration/diafiltration is performed with membranes with a cut-off of 10 KDa.

* * * * *